(12) United States Patent
Doran et al.

(10) Patent No.: US 10,870,476 B2
(45) Date of Patent: *Dec. 22, 2020

(54) INTERIOR MODULE INSTALLATION IN AN AIRCRAFT FUSELAGE

(71) Applicant: The Boeing Company, Chicago, IL (US)

(72) Inventors: Joseph L. Doran, Bothell, WA (US); Andrew R. Hackett, Jr., Lynnwood, WA (US); Mark J. Nadvornick, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/031,802

(22) Filed: Jul. 10, 2018

(65) Prior Publication Data
US 2018/0319478 A1 Nov. 8, 2018

Related U.S. Application Data

(62) Division of application No. 14/723,103, filed on May 27, 2015, now Pat. No. 10,046,843.

(51) Int. Cl.
A47F 5/00 (2006.01)
B64C 1/06 (2006.01)
B64D 11/00 (2006.01)

(52) U.S. Cl.
CPC ............ B64C 1/061 (2013.01); B64D 11/003 (2013.01); B64D 2011/0046 (2013.01)

(58) Field of Classification Search
CPC .................. B64C 1/061; B64D 11/003; B64D 2011/0046
USPC ............ 248/316.8, 188.7, 200.1, 210, 213.2, 248/231.31, 238, 295.11, 558
See application file for complete search history.

(56) References Cited

U.S. PATENT DOCUMENTS

| | | | |
|---|---|---|---|
| 652,010 A | 6/1900 | Wheeler | |
| 804,895 A | 11/1905 | Spencer | |
| 2,101,245 A | 12/1937 | De Franco | |
| 2,392,347 A | 1/1946 | Walker | |
| 4,366,940 A * | 1/1983 | Vargas | ................ F16M 11/046 248/170 |
| 5,108,048 A | 4/1992 | Chang | |
| 5,183,228 A | 2/1993 | Curry | |
| 5,190,183 A | 3/1993 | Mcnaughton et al. | |
| 5,450,976 A | 9/1995 | Chandler | |
| 5,842,668 A | 12/1998 | Spencer | |
| 6,883,753 B1 | 4/2005 | Scown | |
| 7,273,198 B2 * | 9/2007 | Tourtellotte | ........ E04H 12/2238 248/166 |

(Continued)

Primary Examiner — Todd M Epps
(74) Attorney, Agent, or Firm — Miller, Matthias & Hull LLP

(57) ABSTRACT

A method of installing interior modules to support structures in an aircraft fuselage comprises attaching fixed ends of a plurality of tie rods to the support structures; and determining installation length of the tie rods, installation spacing between free ends of the tie rods, and installation orientation of the tie rods prior to positioning the interior module for installation. The method further comprises securing tie rod holding fixtures to the tie rods to hold the spacing and orientation at or near final configuration to facilitate installation of the interior modules.

20 Claims, 8 Drawing Sheets

(56) References Cited

U.S. PATENT DOCUMENTS 8,534,603 B2     9/2013  Grosse-Plankermann et al.
10,046,843 B2 *  8/2018  Doran ..................... B64C 1/061

* cited by examiner

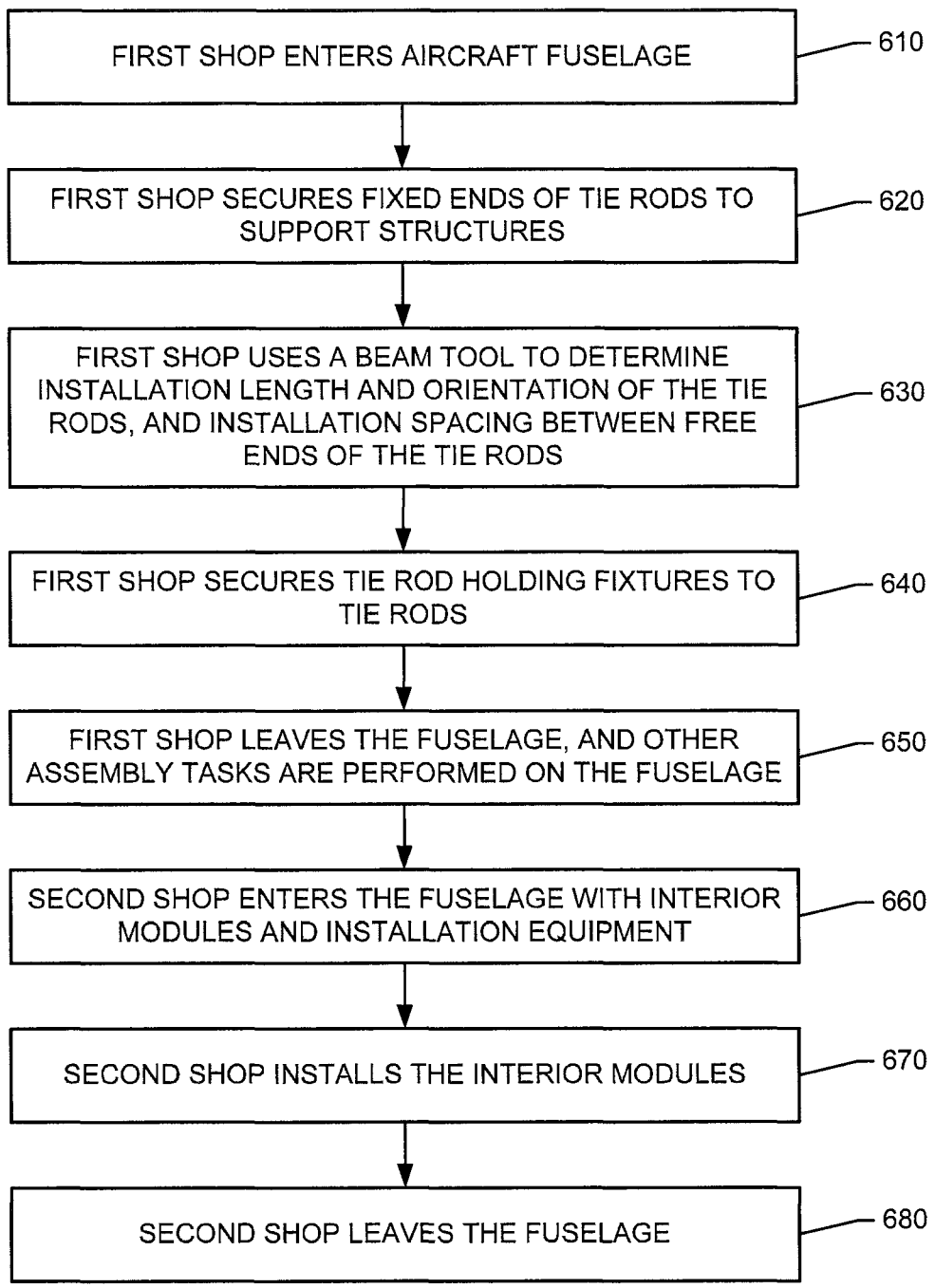

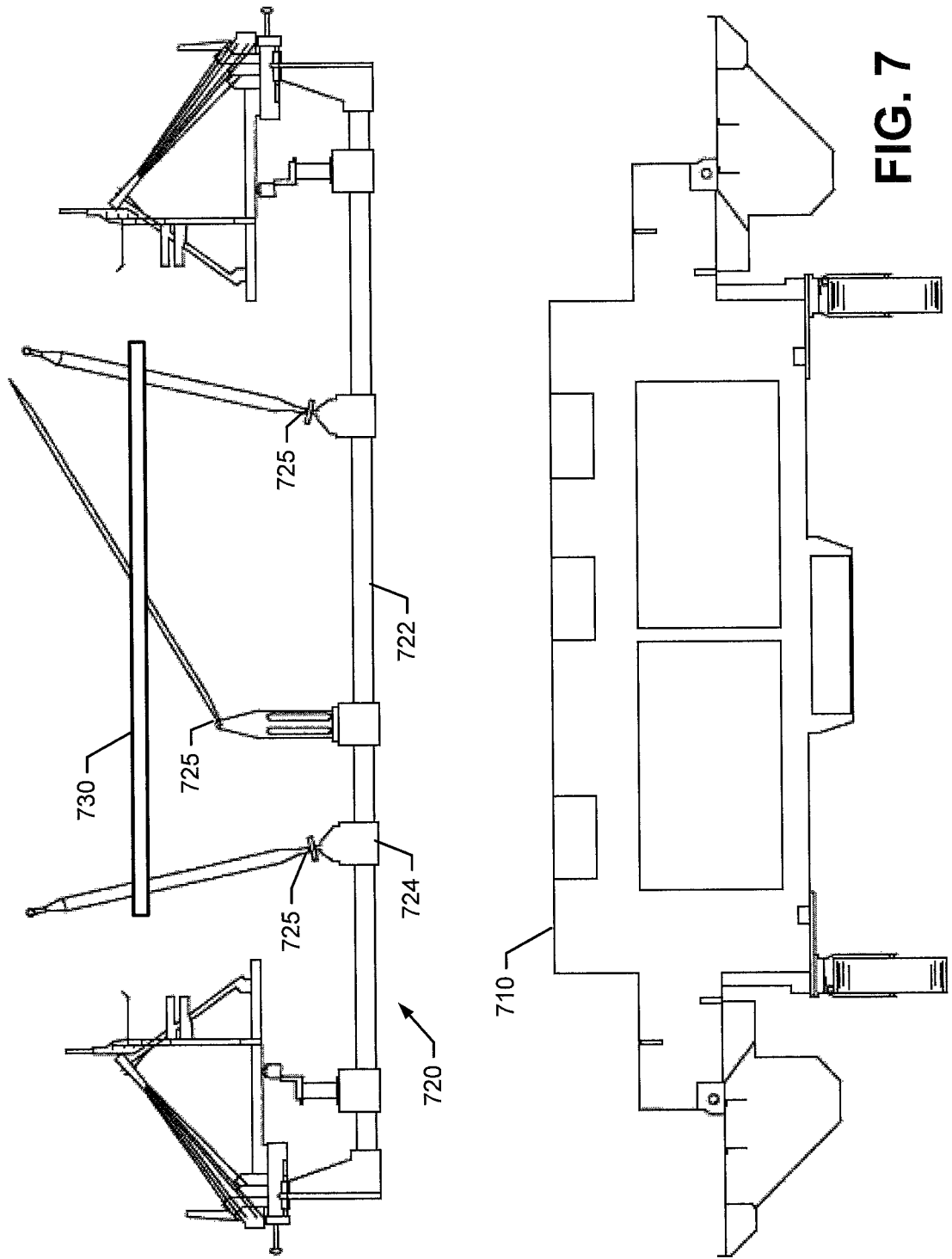

INTERIOR MODULE INSTALLATION IN AN AIRCRAFT FUSELAGE

BACKGROUND

During a typical installation of overhead stowage bins in the fuselage of a large commercial aircraft, a first shop enters the fuselage, installs tie rods to exposed frames and other support structures of the fuselage, and then leaves the fuselage. Later, a second shop enters the fuselage with the overhead stowage bins, and secures the overhead stowage bins to the tie rods.

It is undesirable for the tie rods to hang freely after installation. Stress is placed on fixed ends of the tie rods. To reduce the stress, free ends of the tie rods may be secured to the support structures via zip ties.

When the second shop installs an overhead stowage bin, the zip ties are cut to let the tie rods hang, a beam tool is used to set length, orientation and spacing of the tie rods, the bin is lifted into position, and the overhead stowage bin is secured to the free ends of the tie rods. This procedure is performed for each overhead stowage bin. In a large commercial aircraft, this procedure is repeated many times.

SUMMARY

According to certain aspects of this disclosure, a method of installing interior modules to support structures in an aircraft fuselage includes attaching fixed ends of a plurality of tie rods to the support structures, determining installation length of the plurality of tie rods, installation spacing between free ends of the plurality of tie rods, and installation orientation of the plurality of tie rods prior to positioning the interior modules for installation, and securing a tie rod holding fixture to the plurality of tie rods to hold the installation spacing and installation orientation at or near a final configuration to facilitate installation of the interior modules.

According to additional aspects of this disclosure, an aircraft fuselage includes a plurality of support structures, a plurality of tie rods having fixed ends secured to the support structures, and a plurality of tie rod holding fixtures, each fixture clamped to a set of tie rods that includes a first vertical tie rod, a second vertical tie rod, and a lateral tie rod, so that each holding fixture holds a predetermined spacing and orientation of free ends of the first vertical tie rod, the second vertical tie rod, and the lateral tie rod of the set of tie rods. Each tie rod holding fixture includes a collapsible fixture body, first and second clasps at respective ends of the fixture body, the first and second clasps configured to grasp the first and second vertical tie rods of the set of tie rods, and a third clasp coupled to the fixture body and configured to grasp the lateral tie rod of the set of tie rods.

According to further aspects of this disclosure, a method of installing interior modules to support structures in an aircraft fuselage includes attaching fixed ends of a plurality of tie rods to the support structures, the plurality of tie rods including a first vertical tie rod, a second vertical tie rod, and a lateral tie rod, determining installation length of the plurality of tie rods, installation spacing between free ends of the plurality of tie rods, and installation orientation of the plurality of tie rods prior to positioning the interior modules for installation, and securing a tie rod holding fixture to the plurality of tie rods to hold the installation spacing and installation orientation at or near a final configuration to facilitate installation of the interior modules. The tie rod holding fixture includes a collapsible fixture body, first and second clasps at respective ends of the fixture body, the first and second clasps configured to grasp the first and second vertical tie rods, respectively, and a third clasp coupled to the fixture body and configured to grasp the lateral tie rod.

These features and functions may be achieved independently in various embodiments or may be combined in other embodiments. Further details of the embodiments can be seen with reference to the following description and drawings.

BRIEF DESCRIPTION OF THE DRAWINGS

FIG. 6 is an illustration of a method of securing interior modules to support structures of an aircraft fuselage.

FIG. 7 is an illustration of equipment for securing interior modules to support structures of an aircraft fuselage.

DETAILED DESCRIPTION

Figure 1:
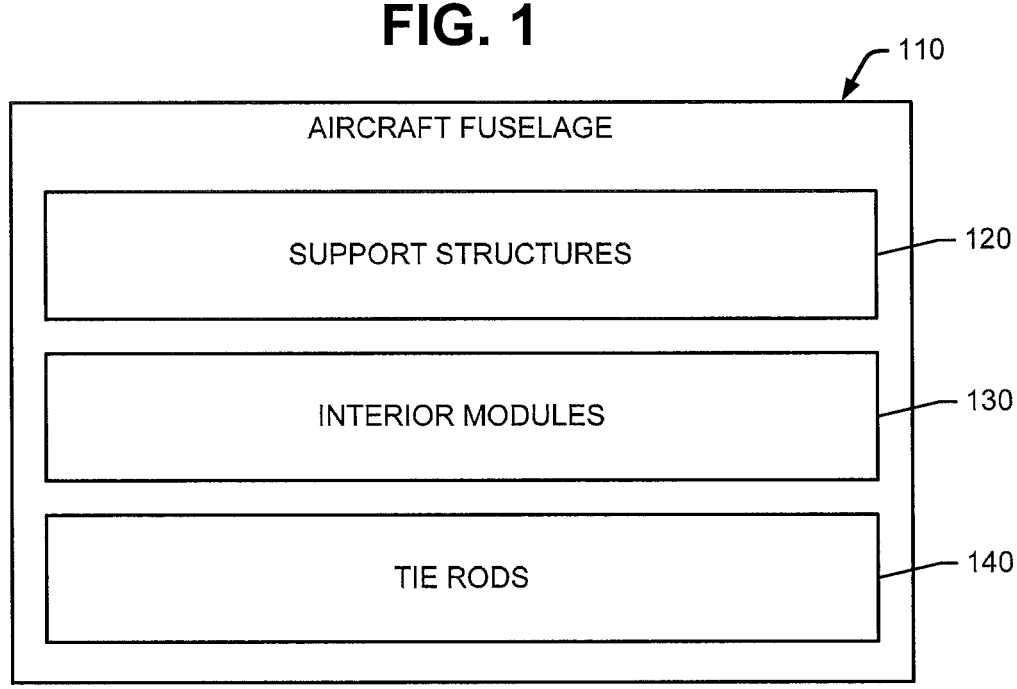
FIG. 1 is an illustration of an aircraft fuselage including a plurality of interior modules and a support system for supporting the interior modules.

FIG. 1 illustrates an aircraft fuselage 110 including a plurality of support structures 120. The support structures 120 include primary support structures and secondary support structures. Examples of the primary support structures include, but are not limited to, airframe members (e.g., frames and stringers), and floor beams. Examples of the secondary support structures include, but are not limited to, rails and ladders.

The fuselage 110 further includes a plurality of interior modules 130. The interior modules 130 include, but are not limited to, overhead bins, ladders, electrical racks, and monuments (e.g. lavatories, galleys, partitions, closets, and other large floor-mounted items).

Some interior modules 130 may be suspended from secondary support structures (e.g., rails) that, in turn, are suspended from primary support structures (e.g. a frame). Other interior modules 130 may be suspended directly from primary support structures. Still other interior modules 130 may be suspended from secondary support structures that are suspended from other secondary support structures.

The fuselage 110 further includes tie rods 140 for suspending the interior modules 130 from the support structures 120. The tie rods 140 have adjustable length for precise positioning of the interior modules 130.

For the purposes herein, a tie rod 140 is defined as an elongated body having adjustable length. For instance, a tie rod 140 may include an elongated tube having threaded ends. Each threaded end may include a threaded bearing that is turned into an out of the tube to adjust length. Each threaded end may be rotated independently by hand or a tool. After the length of a tie rod 140 has been adjusted, a jam nut may be tightened to fix its length. Thus, the tie rods 140 include without limitation conventional tie rods, conventional turnbuckles, and conventional struts. A conventional tie rod has the same type of threaded ends (e.g., both right-hand threads), whereas a conventional turnbuckle has threaded ends of different types (right-hand threads at one end and left-hand threads at the other end).

An end of the tie rod 140 that is or will be fixed to a support structure 120 is referred to as a "fixed" end. An end of the tie rod 140 that is or will be secured to an interior module 130 is referred to as a "free" end.

Figure 2:
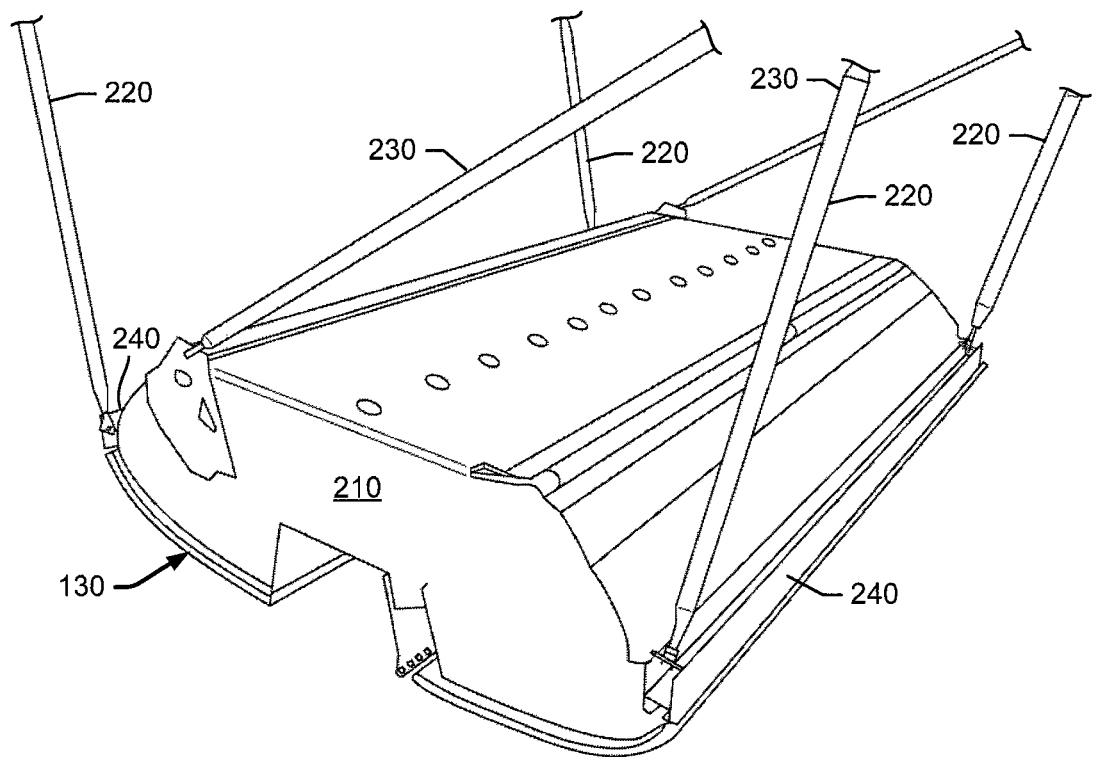
FIG. 2 is an illustration of an example an interior module and tie rods.

FIG. 2 illustrates an example of an interior module 130 that is attached to a primary support structure via tie rods 140. The interior module 130 of FIG. 2 includes an overhead stowage bin 210. The tie rods 140 include vertical tie rods 220 and lateral tie rods 230. Free ends of the tie rods 220 and 230 are secured to center rails 240 on the overhead stowage bin 210.

Figure 3:
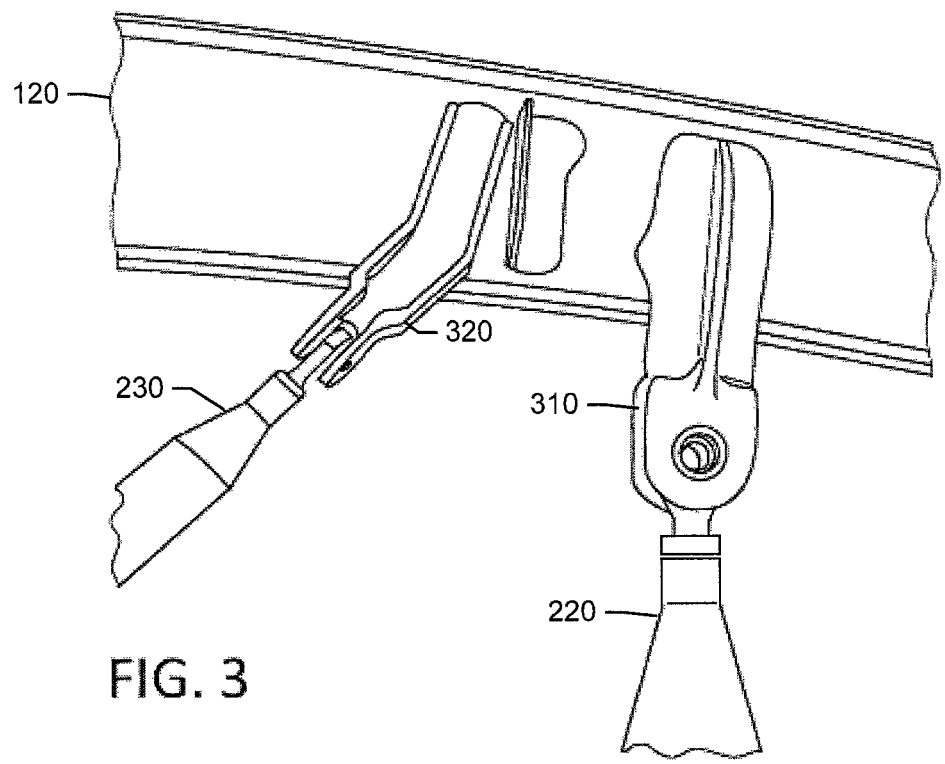
FIG. 3 is an illustration of tie rods secured to a support structure of the aircraft fuselage.

FIG. 3 illustrates how the vertical and lateral tie rods 220 and 230 may be secured to a support structure 120 (e.g., a crown structure). Fixed ends of the tie rods 220 and 230 are attached (e.g., with a bolt or quick disconnect pin) to devises 310 and 320, which are fastened to the support structure 120. Compare the relative orientations of the devises 310 and 320. The clevis 310 for the vertical tie rod 220 is relatively normal to the support structure 120, whereas the clevis 320 for the lateral tie rod 230 is angled.

Figure 4:
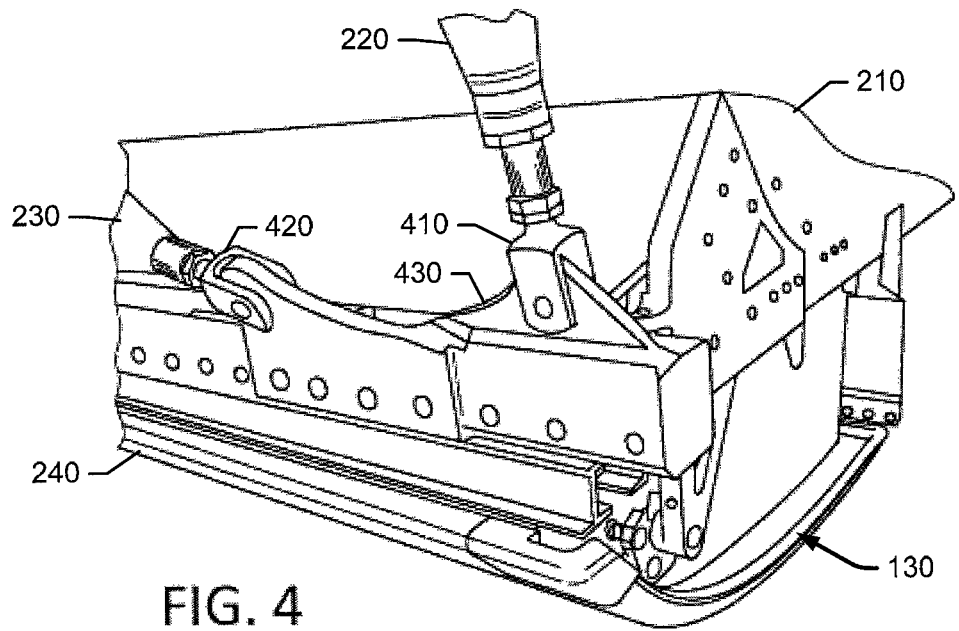
FIG. 4 is an illustration of tie rods secured to an overhead stowage bin.

FIG. 4 illustrates how the vertical and lateral tie rods 220 and 230 may be secured to the overhead stowage bin 210. The vertical tie rods 220 hang from the support structures 120 at no more than a slight angle (e.g., 15 degrees from vertical), and the lateral tie rods 230 are angled at about 45 degrees from vertical. Free ends of the vertical and lateral tie rods 220 and 230 terminate in devises 410 and 420, which are secured to a fitting 430. The fitting 430 engages one of the center rails 240. Other tie rods may be secured to the overhead stowage bin 210 in a similar manner, or they may be secured directly to the overhead stowage bin 210.

Figure 5:
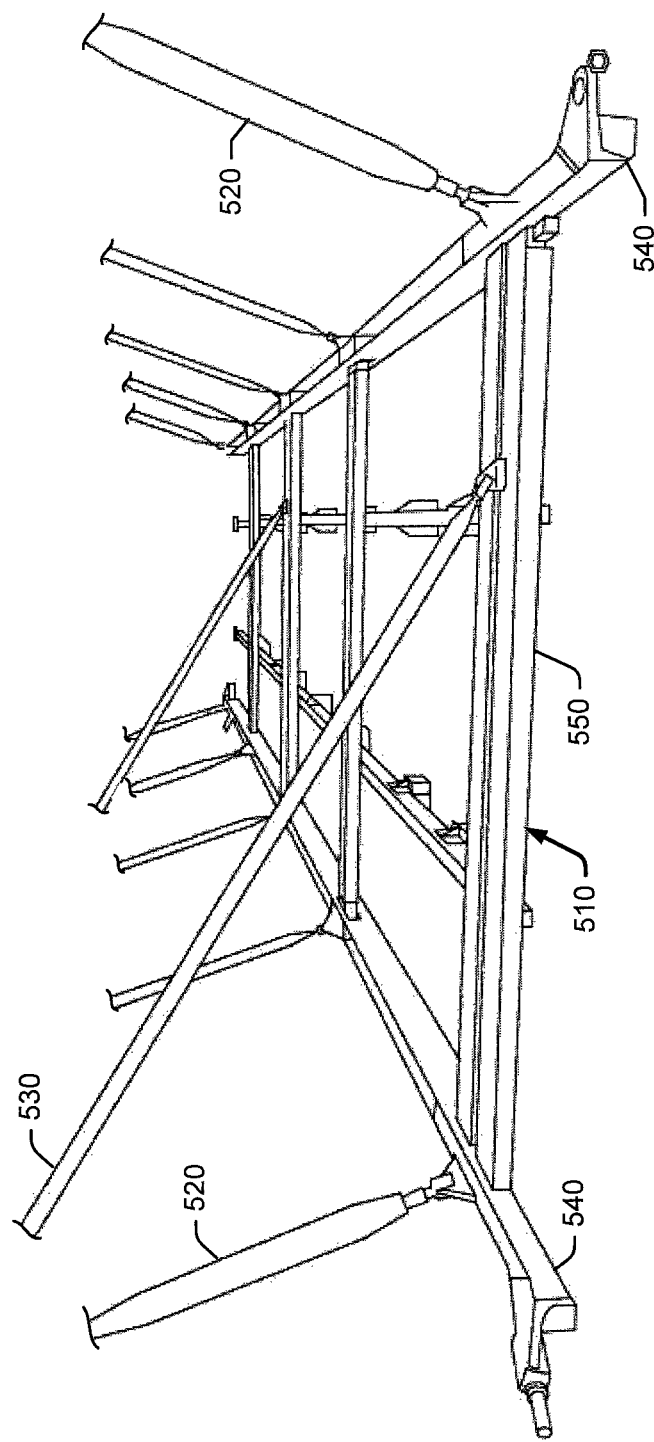
FIG. 5 is an illustration of another example an interior module and tie rods.

FIG. 5 illustrates another example of an interior module 130 and its tie rods 140. The interior module 130 of FIG. 5 includes a ladder 510. The tie rods 140 include vertical tie rods 520 and lateral tie rods 530. Free ends of vertical tie rods 520 are secured to center rails 540 of the ladder 510. Free ends of lateral tie rods 530 are secured to cross bars 550 of the ladder 510.

Reference is now made to FIGS. 6 and 7, which illustrate a method and equipment for securing interior modules 130 to support structures 120 of the fuselage 110 of an advanced commercial jetliner. The method may be performed while the fuselage 110 is progressing through a moving assembly line. The moving line assembly refers to a build process from initial buildup of fuselage sections to roll out at final assembly. During this build process, fuselage body sections may be supported and moved by crawlers in a straight line, while various types of work are performed on the fuselage sections. Subsequently, the fuselage sections are joined together to form a full fuselage 110.

As used herein, work performed on the fuselage 110 refers to work that is performed on one or more sections of the fuselage 110 or work that is performed on a full fuselage 110.

The various type of work on the fuselage 110 is divided among "shops." A shop may be a work team such as a group of mechanics Each shop has its own responsibility.

Prior to the method of FIG. 6 being performed, a shop has already entered the fuselage 110 and attached devises to the support structures 120. Thereafter, the interior of the fuselage 110 may be wrapped with insulation. Even if the interior of the fuselage 110 has been wrapped with insulation, the devises will still stick out of the insulation and will be visible.

The method of FIG. 6 begins after the devises have been attached to the support structures 120. At block 610, a first Systems and Installation (S&I) shop enters the fuselage with tie rods 140, fasteners, and equipment including an interior work stand 710, a beam tool 720, and tie rod holding fixtures 730.

At block 620, the work stand 710 is moved into position. The work stand 710 may be a single elevated platform that spans the entire interior length of the fuselage 110.

At block 620, at each interior module location, the fixed ends of a plurality of tie rods 140 are secured to one or more support structures 120. Not all exposed devises fitting are necessarily used. The first shop may use drawings to determine which devises and tie rods 140 to use.

At block 630, a beam tool 720 is used to determine installation length of the tie rods 140, installation spacing between free ends of the tie rods 140, and installation orientation of the tie rods 140. The beam tool 720 may include an elongated beam 722 having stations 724. The stations 724 correspond to locations of attachment points on the interior modules 130. The beam tool 720 may be indexed to two outboard rails. Three-point locations (WL, BL and STA) of the free ends may be pre-set on the beam tool 720. Length of each tie rod 140 may be adjusted so that its free end touches a point 725 on a station 724.

At block 640, the tie rod holding fixtures 730 are secured to the tie rods 140. The tie rod holding fixtures 730 hold the spacing and orientation of the free ends of the tie rods 140. Their purpose is to hold the tie rods 140 at or near final configuration to facilitate installation of the interior modules 130. Tie rod holding fixtures 730 may be applied to most, if not all, of the tie rods 140.

Figure 8A:
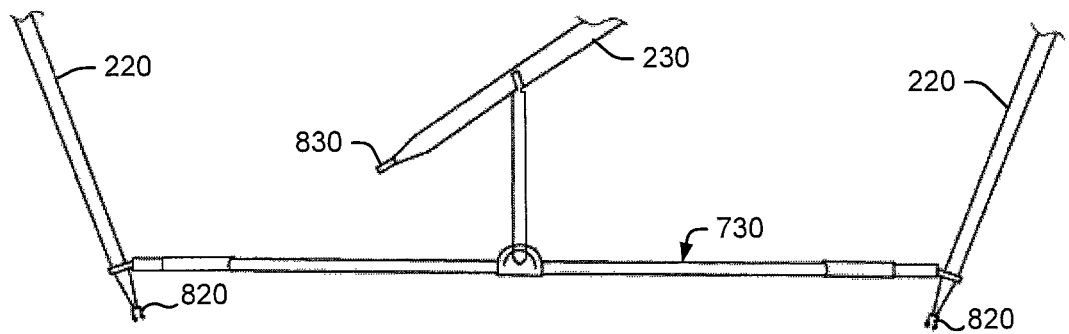
FIG. 8A is an illustration of a tie rod holding fixture that is holding a lateral tie rod and two vertical tie rods prior to installation of an interior module.

FIG. 8A illustrates an example of a tie rod holding fixture 730 at this stage of work. The tie rod holding fixture 730 is holding a lateral tie rod 230 and two vertical tie rods 220. The tie rods 220 and 230 have devises at their free ends. These devises will eventually be secured to an interior module 130.

At block 650, the first shop completes its work, removes the work stand 710 and the beam tool 720, and leaves the fuselage 110. Other fuselage assembly tasks may be performed. Several days may elapse before the fuselage 110 is ready for the interior modules 130 to be installed.

At block 660, a second S&I shop enters the fuselage 110 with interior modules 130 and equipment for installing the interior modules 130. The installation equipment may include lifts for raising the interior modules 130 to their installation positions, and step ladders for enabling installers to attach the free ends of the tie rods 140 to the fittings on the interior modules 130. The work stand 710 and beam tool 720 are not needed by the second shop.

At block 670, the interior modules 130 are installed. During installation, an interior module 130 is lifted into an approximate position for installation, and each tie rod 140 is unclipped from the tie rod holding fixture 730, and secured to the interior module 130. The same installation procedure may be performed for each interior module 130.

Figure 8B:
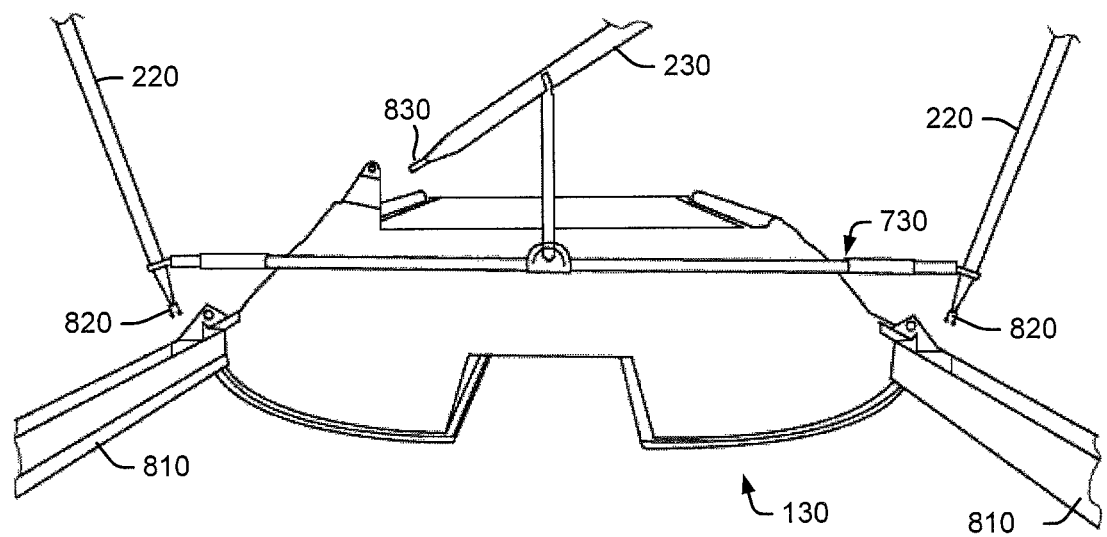
FIG. 8B is an illustration of the tie rod holding fixture and the tie rods during installation of an interior module.

FIG. 8B illustrates an example of an interior module 130 after being lifted into an approximate position for installation. The interior module 130 is supported by center rails 810. Clevises 820 and 830 at the free ends of the tie rods 220 and 230 are at or proximate their fittings on the interior module 130 and center rails 810 (the free ends may be slightly wider to make the installation easier). The tie rod holding fixture 730 holds the orientation and spacing of the free ends.

Each tie rod 220 and 230 is removed from the tie rod holding fixture 730, and its clevis 820 or 830 is placed over a fitting. Each clevis 820 and 830 is secured to its fitting by means such as a bolt or quick connect pin. The installed interior module 130 is illustrated in FIG. 2.

Only one tie rod holding fixture 730 is illustrated in FIGS. 8A and 8B. A second tie rod holding fixture 730 may be used to hold tie rods 140 at an opposite side of the interior module 130. A third tie rod holding fixture 730 may be used to hold any tie rods between the first and second sides of the interior module 130.

Reference is once again made to FIG. 6. At block 680, after the interior modules 130 have been installed, the second shop leaves the fuselage 110.

The use of the tie rod holding fixtures 730 eliminates the need for the first shop to secure free ends of the tie rods 140 to support structures 120 via zip ties, and it eliminates the need for the second shop to cut the zip ties to release the free ends of the tie rods 140. The use of the tie rod holding fixtures 730 also eliminates potential foreign object debris (the cut zip ties) during installation.

The tie rod holding fixtures 730 also enable the workflow of interior module installation to be changed. It enables the beam tool 720 to be used earlier in the workflow to adjust the length of the tie rods 140.

The method of FIG. 6 is also safer and more ergonomic than conventional methods, in that it enables the beam tool 720 to be used while installers are standing on the work stand 710 instead of ladders. The work stand 710 is inherently more stable than individual step ladders.

The method of FIG. 6 is not limited to advanced commercial jetliners. It may be applied to other types of aircraft, such as military aircraft and cargo aircraft.

The tie rod holding fixture 730 is not limited to any particular configuration. A first example of the tie rod holding fixture 730 is illustrated in FIGS. 9A and 9B, and a second example is illustrated in FIGS. 10A and 10B.

In both examples, the tie rod holding fixture 730 is collapsible between a stowed position and a deployed position. Collapsing the tie rod holding fixture 730 makes it easier to handle.

Figure 9A:
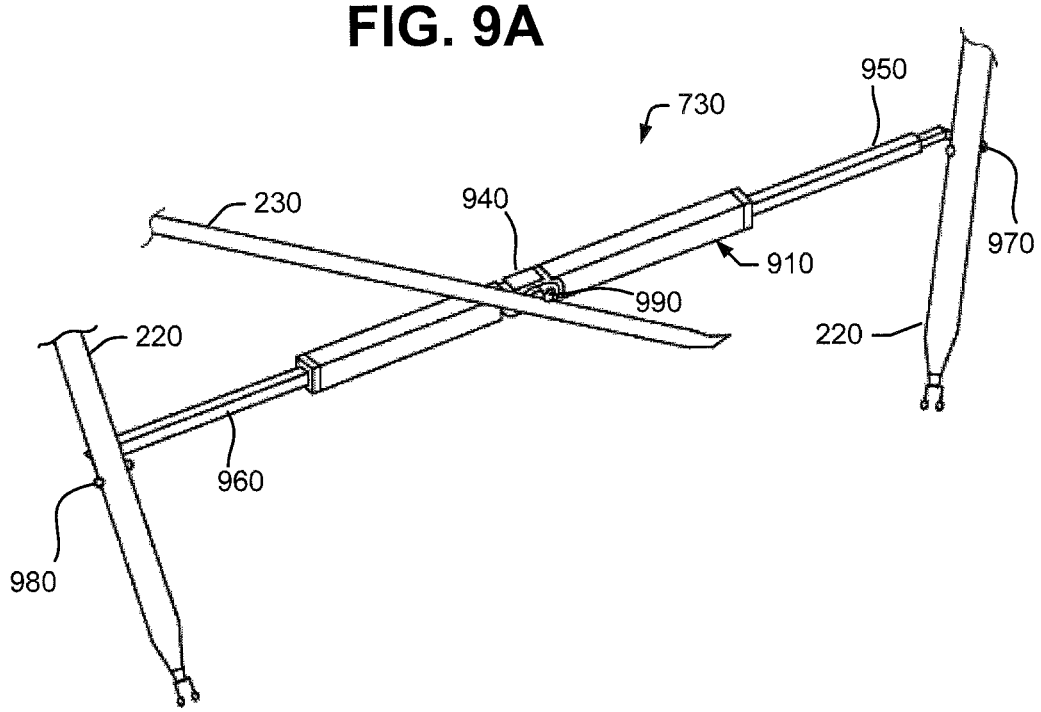
FIGS. 9A and 9B are illustrations of a first example of a tie rod holding fixture.
Figure 9B:
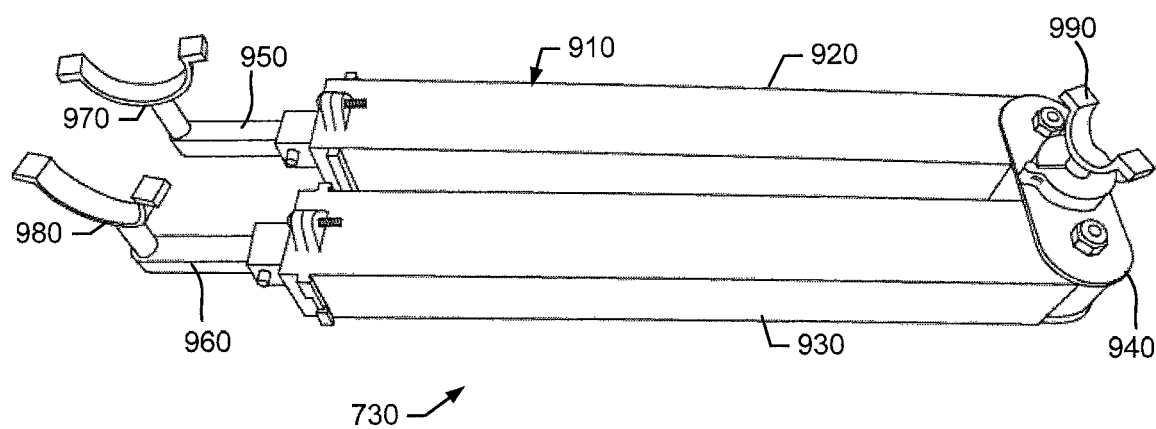
Figure 10A:
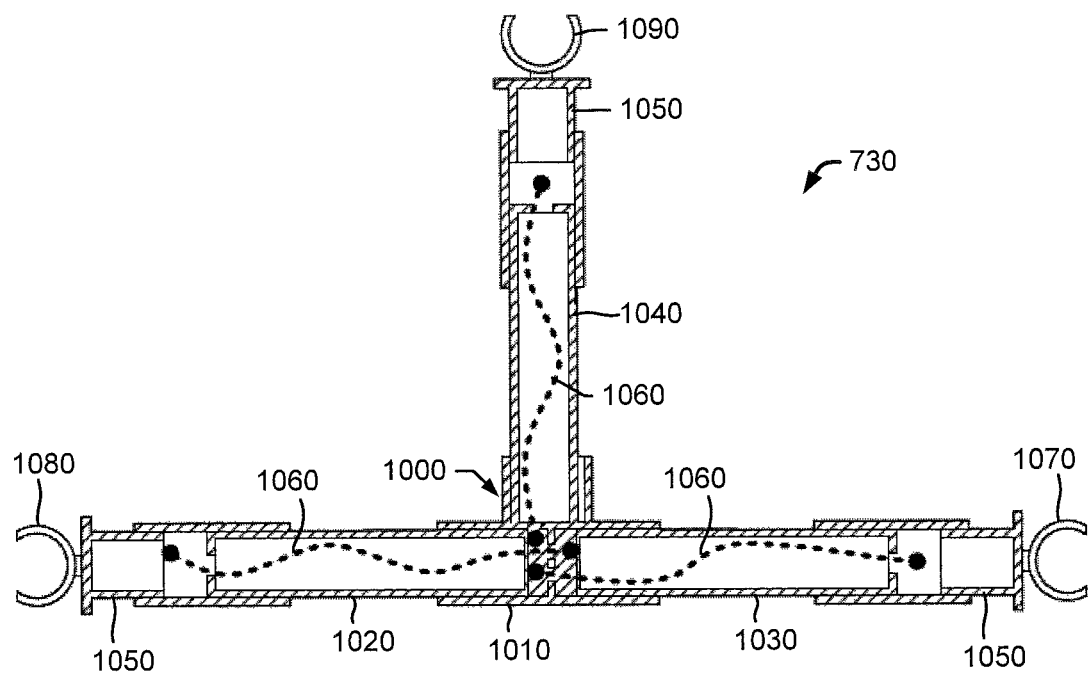
FIGS. 10A and 10B are illustrations of a second example of a tie rod holding fixture.
Figure 10B:
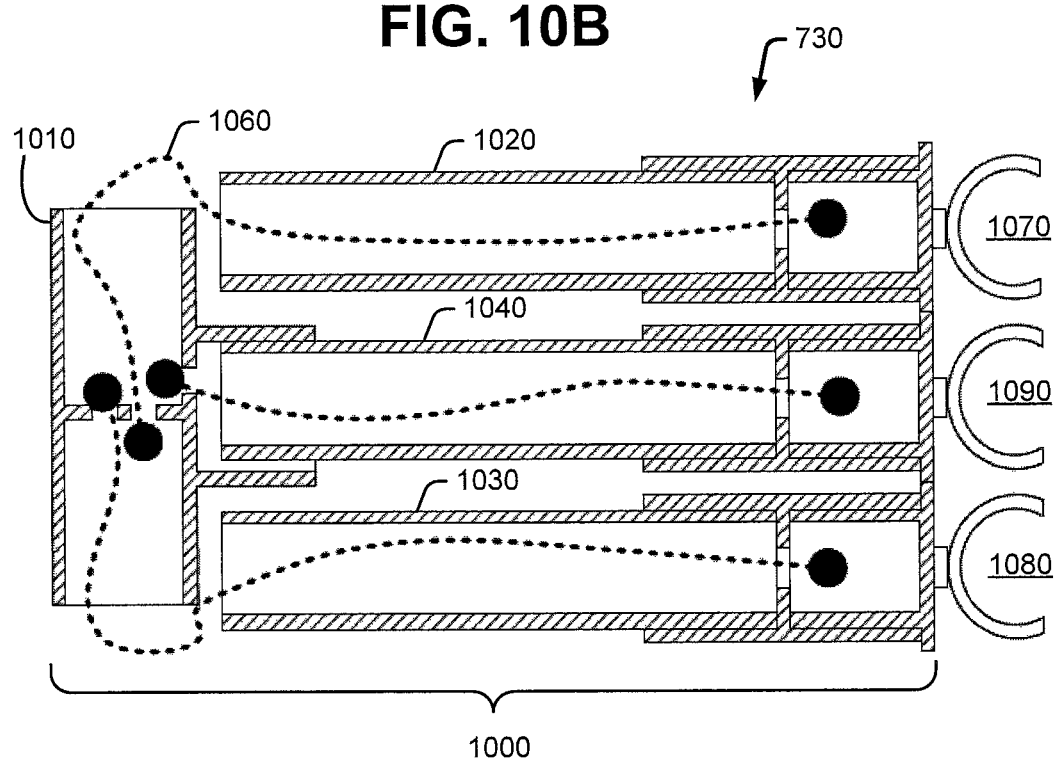

In the example of FIGS. 9A and 9B, the tie rod holding fixture 730 includes an elongated fixture body 910 having an adjustable length. The fixture body 910 includes a first segment 920, a second segment 930, and a hinge 940 for hinging a near end of the first segment 920 to a near end of the second segment 930. A first arm 950 and a second arm 960 extend from far ends of the first and second segments 920 and 930.

The tie rod holding fixture 730 further includes a first clasp 970, a second clasp 980, and a third clasp 990. The first and second clasps 970 and 980 are secured to the first and second telescoping arms 950 and 960, respectively, and the third clasp 990 is secured to the hinge 940. The clasps 970, 980 and 990 may be similar to conventional snap clamps that are used for grabbing and locating pipes.

FIG. 9A shows the tie rod holding fixture 730 in the deployed position. The first and second segments 920 and 930 are aligned. The first and second arms 950 and 960 can be slid into and out of their corresponding segments 920 and 930 to adjust distance between the first and second clasps 970 and 980.

The first and second clasps 970 and 980 firmly grasp the vertical tie rods 220. The third clasp 990 firmly grasps the lateral tie rod 230. By supporting the lateral tie rod 230, the third clasp 990 reduces stress on the clevis holding the fixed end of the lateral tie rod 230 to the support structure 120.

FIG. 9B shows the tie rod holding fixture 730 after it has been collapsed to the stowed position. The first and second segments 920 and 930 are side by side, and the first and second clasps 970 and 980 are side by side.

In the second example of FIGS. 10A and 10B, the tie rod holding fixture 730 includes fixture body 1000. The fixture body 1000 includes a connector 1010 and first, second and third arms 1020, 1030 and 1040. Each arm 1020, 1030 and 1040 can be inserted into and removed from a corresponding receptacle in the connector 1010. The fixture body 1000 further includes tube portions 1050 that can be slide into and out of the arms 1020, 1030 and 1040. First and second clasps 1070 and 1080 are secured to the tube portions 1050 at the ends of the first and second arms 1020 and 1030. A third clasp 1090 is secured to the tube portion 1050 at the end of the third arm 1040.

FIG. 10A shows the tie rod holding fixture in a deployed position. Each arm 1020, 1030 and 1040 is inserted in a receptacle in the connector 1010, whereby the tie rod holding fixture 730 has a T-shape. The first and second arms 1020 and 1030 are axially aligned, and the third arm 1040 is orthogonal to the first and second arms 1020 and 1030. The tube portions 1050 may slide in and out of their corresponding arms 1020, 1030 and 1040 to adjust the positions of the clasp 1070, 1080 and 1090.

As illustrated in FIG. 10B, the tie rod holding fixture 730 may be collapsed by removing the arms 1020, 1030 and 1040 from the connector 1010. The arms 1020, 1030 and 1040 may be tethered to the connector 1010 by chords 1060. The arms 1020, 1030 and 1040 may be arranged side by side in a compact position for stowage.

What is claimed is:

1. A method of installing interior modules to support structures in an aircraft fuselage, the method comprising:
    attaching fixed ends of a plurality of tie rods to the support structures;
    determining installation length of the plurality of tie rods, installation spacing between free ends of the plurality of tie rods, and installation orientation of the plurality of tie rods prior to positioning the interior modules for installation; and
    securing a tie rod holding fixture to the plurality of tie rods to hold the installation spacing and installation orientation at or near a final configuration to facilitate installation of the interior modules.

2. The method of claim 1, further comprising installing the interior module to the free ends of the plurality of tie rods while removing the tie rod holding fixture.

3. The method of claim 2, wherein installing the interior module to the free ends of the plurality of tie rods while removing the tie rod holding fixture comprises installing an overhead stowage bin to the free ends of the plurality of tie rods while removing the tie rod holding fixture.

4. The method of claim 2, wherein the attaching, determining and securing are performed while the fuselage is progressing through a moving assembly line.

5. The method of claim 4, wherein a plurality of shops perform work on the fuselage while the fuselage is progressing through the moving assembly line, wherein a first shop of the plurality of shops secures the holding fixtures to the plurality of tie rods, and later, a second shop of the plurality of shops installs the interior modules to the free ends of the plurality of tie rods.

6. The method of claim 5, wherein securing the holding fixtures to the plurality of tie rods at the first shop comprises attaching the fixed end of the plurality of tie rods to exposed devises attached to the support structures.

7. The method of claim 5, wherein the first shop uses a beam tool to determine the installation length of the plurality of tie rods, the installation orientation of the plurality of tie rods, and the installation spacing between the free ends of the plurality of tie rods, prior to securing the tie rod holding fixtures.

8. The method of claim 7, wherein securing the tie rod holding fixtures to the plurality of tie rods at the first shop comprises moving an elevated platform that spans an interior length of the fuselage.

9. The method of claim 7, wherein the second shop installs the interior modules without using the beam tool.

10. The method of claim 1, wherein:
the plurality of tie rods includes first and second vertical tie rods and a lateral tie rod; and
securing the tie rod holding fixture to each of the plurality of tie rods comprises securing the tie rod holding fixture to the first and second vertical tie rods and the lateral tie rod of each of the tie rods.

11. The method of claim 10, wherein:
at least one of the tie rod holding fixtures includes an elongated fixture body having an adjustable length, first and second clasps located at opposite ends of the fixture body, the first and second clasps configured to firmly grasp the vertical tie rods, and a third clasp coupled to the fixture body and configured to firmly grasp the lateral tie rod; and
securing the tie rod holding fixture to the plurality of tie rods comprises securing the first and second clasps to the vertical tie rods and securing the third clasp to the lateral tie rod.

12. The method of claim 11, wherein the fixture body is collapsible between a stowed position and a deployed position; and wherein the fixture body is moved from the stowed position to the deployed position just prior to securing the tie rod holding fixtures to the plurality of tie rods.

13. The method of claim 12, wherein:
the fixture body includes first and second segments having respective near ends hinged together by a hinge, and the third clasp is secured to the hinge; and
moving the fixture body from the stowed position to the deployed position comprises moving the first and second segments from a side by side configuration and moving the first and second clasps from a side by side configuration.

14. The method of claim 12, wherein the fixture body includes a connector, a first arm, a second arm, and a third arm, wherein the first, second and third clasps are at far ends of the first, second and third arms; and wherein moving the fixture body from the stowed position to the deployed position comprises inserting near ends of the first, second and third arms in the connector.

15. The method of claim 14, wherein the first, second and third arms are tethered to the connector by cords; and wherein moving the fixture body from the stowed position to the deployed position comprises maintaining tethered connection of the first, second, and third arms to the connector using the cords.

16. An aircraft fuselage comprising:
a plurality of support structures;
a plurality of tie rods having fixed ends secured to the support structures; and
a plurality of tie rod holding fixtures, each fixture clamped to a set of tie rods that includes a first vertical tie rod, a second vertical tie rod, and a lateral tie rod, so that each holding fixture holds a predetermined spacing and orientation of free ends of the first vertical tie rod, the second vertical tie rod, and the lateral tie rod of the set of tie rods, each tie rod holding fixture including:
a collapsible fixture body;
first and second clasps at respective ends of the fixture body, the first and second clasps configured to grasp the first and second vertical tie rods of the set of tie rods; and
a third clasp coupled to the fixture body and configured to grasp the lateral tie rod of the set of tie rods.

17. The aircraft fuselage of claim 16, wherein the first clasp is disposed at a first orientation angle to grasp the first vertical tie rod, the second clasp is disposed at a second orientation angle, different from the first orientation angle, to grasp the second vertical tie rod, the third clasp is disposed at a third orientation angle, different from the first and second orientation angles, to grasp the lateral tie rod.

18. The aircraft fuselage of claim 16, wherein the collapsible fixture body includes a first segment, a second segment, and a hinge connected between respective near ends of the first and second segments; and wherein the third clasp is secured to the hinge of the fixture body.

19. A method of installing interior modules to support structures in an aircraft fuselage, the method comprising:
attaching fixed ends of a plurality of tie rods to the support structures, the plurality of tie rods including a first vertical tie rod, a second vertical tie rod, and a lateral tie rod;
determining installation length of the plurality of tie rods, installation spacing between free ends of the plurality of tie rods, and installation orientation of the plurality of tie rods prior to positioning the interior modules for installation; and
securing a tie rod holding fixture to the plurality of tie rods to hold the installation spacing and installation orientation at or near a final configuration to facilitate installation of the interior modules, the tie rod holding fixture including:
a collapsible fixture body;
first and second clasps at respective ends of the fixture body, the first and second clasps configured to grasp the first and second vertical tie rods, respectively; and
a third clasp coupled to the fixture body and configured to grasp the lateral tie rod.

20. The method of claim 19, wherein:
the collapsible fixture body includes a first segment, a second segment, and a hinge connected between respective near ends of the first and second segments and the third clasp is secured to the hinge of the fixture body; and
securing the tie rod holding fixture to the plurality of tie rods comprises securing the third clasp of the tie rod holding fixture to the lateral tie rod.

* * * * *

UNITED STATES PATENT AND TRADEMARK OFFICE
CERTIFICATE OF CORRECTION

PATENT NO. : 10,870,476 B2  
APPLICATION NO. : 16/031802  
DATED : December 22, 2020  
INVENTOR(S) : Joseph L. Doran et al.

Page 1 of 1

It is certified that error appears in the above-identified patent and that said Letters Patent is hereby corrected as shown below:

In the Claims

At Column 7, Line 8, delete the word "devises" and substitute therefore --clevises--

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*